United States Patent (10) Patent No.: US 7,757,803 B2
Fiske et al. (45) Date of Patent: Jul. 20, 2010

(54) MOTOR VEHICLE OPERATOR IDENTIFICATION AND MAXIMUM SPEED LIMITER

(76) Inventors: Richard Fiske, 9 Hillcrest Ave., Shrewsbury, MA (US) 01545; Andrew Surabian, 55 Elm Street, Shrewsbury, MA (US) 01545; Kevin Weigold, 64 Edgewood Rd., Shrewsbury, MA (US) 01545

( * ) Notice: Subject to any disclaimer, the term of this patent is extended or adjusted under 35 U.S.C. 154(b) by 561 days.

(21) Appl. No.: 11/486,486

(22) Filed: Jul. 14, 2006

(65) Prior Publication Data
US 2010/0042303 A1 Feb. 18, 2010

(51) Int. Cl.
*B60D 1/28* (2006.01)
(52) U.S. Cl. ...................... 180/271; 180/282
(58) Field of Classification Search ......... 180/271, 180/272, 282; 701/70
See application file for complete search history.

(56) References Cited
U.S. PATENT DOCUMENTS

| 4,734,693 | A | * | 3/1988 | Dluhosch et al. | 340/5.23 |
| 4,990,906 | A | * | 2/1991 | Kell et al. | 340/5.23 |
| 5,757,086 | A | * | 5/1998 | Nagashima | 307/10.6 |
| 5,801,616 | A | * | 9/1998 | Ghazarian et al. | 340/426.36 |
| 5,808,543 | A | * | 9/1998 | Peyre | 340/426.11 |
| 6,078,265 | A | * | 6/2000 | Bonder et al. | 340/5.23 |
| 6,501,369 | B1 | * | 12/2002 | Treharne | 340/5.22 |
| 6,647,328 | B2 | * | 11/2003 | Walker | 701/36 |
| 6,772,061 | B1 | * | 8/2004 | Berthiaume et al. | 701/110 |
| 7,006,914 | B1 | * | 2/2006 | Cahoon | 701/115 |
| 7,315,779 | B1 | * | 1/2008 | Rioux et al. | 701/114 |
| 2004/0074682 | A1 | * | 4/2004 | Fussey et al. | 180/65.2 |
| 2004/0234109 | A1 | * | 11/2004 | Lemelson et al. | 382/118 |
| 2004/0262068 | A1 | * | 12/2004 | Matsubara et al. | 180/287 |
| 2004/0263316 | A1 | * | 12/2004 | Dix et al. | 340/5.23 |
| 2005/0203752 | A1 | * | 9/2005 | Shinada | 705/1 |
| 2006/0082434 | A1 | * | 4/2006 | Brey | 340/5.6 |
| 2006/0273885 | A1 | * | 12/2006 | Thompson | 340/426.34 |

FOREIGN PATENT DOCUMENTS

JP 2008265676 A * 11/2008

* cited by examiner

*Primary Examiner*—Faye M. Fleming
(74) *Attorney, Agent, or Firm*—Wolf, Greenfield & Sacks, P.C.

(57) ABSTRACT

A programmable device that interfaces with a motor vehicle. The device is programmed to identify the operator who is gaining access to the motor vehicle. The device is further programmed to associate a maximum allowable speed with each person allowed to operate the motor vehicle. The device incorporates an access and operation means together with a computer that is compatible with the motor vehicle on board computer. The computer includes in it's output a signal that controls the maximum allowable speed that the on board computer will permit the motor vehicle to operate at for the identified operator.

13 Claims, 1 Drawing Sheet

MOTOR VEHICLE OPERATOR IDENTIFICATION AND MAXIMUM SPEED LIMITER

BACKGROUND

The present invention involves motor vehicles. In particular the maximum allowable speed that the motor vehicle may be operated at by a particular operator. As recent events have demonstrated an inexperienced motor vehicle operator will often have difficulty safely operating a motor vehicle at high speeds. The inexperienced operator has not developed the necessary skills to properly react when the road suddenly curves to the left or right. There are many other situations that the inexperienced operator lacks the ability to properly deal with. The result is often tragedy, sometimes resulting in death to the operator, passengers and occupants of a second or third motor vehicle. Although there are many well qualified driver education courses available, there is no substitute for experience. The problem is that motor vehicles are not designed to evaluate the operator as to experience or competence. Motor vehicles, as presently marketed, will allow any operator to drive the motor vehicle at any speed regardless of the situation or experience level of the operator.

The present invention provides a solution to this problem by identifying the operator when the operator goes to gain access to the motor vehicle or to operate same. The access and operation device used by the operator is usually the standard ignition key. The problem is that once access and operation is achieved there is no restriction on the maximum speed at which the operator may drive the vehicle. The present invention uses a device, which may be an ignition key that incorporates a computer chip, to identify the operator and further the maximum motor vehicle speed that may be attained by that particular operator. Upon the identity of the operator being established the access and operation device will provide an input to a computer on the motor vehicle, this may be the standard on board computer. The input includes a maximum allowable speed that the motor vehicle may be operated at. This maximum allowable speed would be different for each operator that is allowed to operate the motor vehicle. In addition the maximum speed may be adjusted (increased or decreased) from time to time, depending on the circumstances and increased driving experience of the operator.

There are other options to using an ignition key, with a computer chip incorporated therein, to identify a specific operator together with a maximum allowable motor vehicle operating speed. For instance: an access pad that requires the operator to enter a code before the vehicle may be started could include a maximum allowable motor vehicle speed along with the operators identity. The problem with either of the foregoing is that any operator could obtain another operators ignition key or entry code. The motor vehicle would not know if the actual operator is the same person as identified by the ignition key or entry code. Therefore to make the system work there would need to be a certain level of security involving the storage of ignition keys or knowledge of entry codes. In order to eliminate the possibility of an operator making use of another operators ignition key or entry code an entry device could be used that required positive voice, finger print, eye scan or other physical feature identification to permit access and operation. Such a system could be expensive, however how much is a life worth?

The present invention is a new and improved device for limiting the maximum allowable speed of a motor vehicle based upon the identity of the operator. The maximum allowable speed may be determined separately for each operator of the motor vehicle. In addition the maximum allowable speed may be adjusted for each operator, from time to time, depending on the operators level of expertise and experience.

An object of the invention is to provide a device that limits the maximum allowable speed of a motor vehicle for each individual that operates the motor vehicle.

Another object of the invention is to permit adjustments to the maximum allowable speed for any individual depending on changes in circumstances.

A further object of the invention is to limit the maximum operating speed of the motor vehicle to prevent an inexperienced operator from exceeding normal speed limits.

A still further object of the invention is to reduce and possibly eliminate motor vehicle accidents involving inexperienced operators driving the motor vehicle at excessive speeds.

SUMMARY OF THE INVENTION

The present invention involves a system to control the maximum speed at which a motor vehicle may be operated. The system further allows for flexibility in that the maximum allowable speed may be different depending on who is operating the motor vehicle. For instance the maximum speed for a new inexperienced operator could be lower than that for a more experienced operator. In addition the maximum speed for any operator could be increased or reduced from time to time as the situation may dictate.

The system may involve the use of an ignition key that incorporates a programmable chip. The programmable chip interacts with a computer, that may be the standard on board computer, to control the motor vehicles maximum speed. The computer (standard on board or otherwise) senses the motor vehicle speed. When the motor vehicle speed reaches the maximum speed, programmed into the ignition key chip, the computer limits any further increase in the motor vehicles speed. The computer could control the maximum motor vehicle speed by any number of ways including: limiting the fuel flow to the engine; interrupting the spark or causing a limit or interruption of some other component of the engine that has the result of preventing the motor vehicle from any further increase in speed. This limitation on any further increase in speed of the motor vehicle would take into account safety considerations and not create an unsafe rapid reduction in speed or a loss of control.

The system could involve the use of some other device, electronic or otherwise that may not require the use of an ignition key, that is capable of identifying the operator and further permitting operation of the motor vehicle. Such devices could include: touch pads, that involve the use of a series of numbers to permit access to the motor vehicle, including the identity of the operator, and thereafter allow operation thereof, scanners that identify the operator, (by scanning a finger, eye or other body part) to permit access to the motor vehicle, and thereafter allow operation thereof; or computers that are activated by sound, smell or other characteristic to identify the operator to permit access to the motor vehicle, and thereafter allow operation thereof. It is assumed that all of the foregoing are capable of being programmed to identify the specific operator and further to interact with the standard on board computer, or such other computer, that senses the motor vehicle speed, to control the maximum motor vehicle speed. In the event that the access and operation device is only capable of identifying the operator then the standard on board computer, or additional computer, would need to be capable of being programmed to control the maximum motor vehicle speed based upon the identity of the operator as sensed.

While the invention will be discussed in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

BRIEF DESCRIPTION OF THE DRAWINGS

The object and features of the invention may be understood with reference to the following detailed description of an illustrative embodiment of the invention, taken together with the accompanying drawings in which.

BRIEF DESCRIPTION OF THE PREFERRED EMBODIMENT

Figure 1:
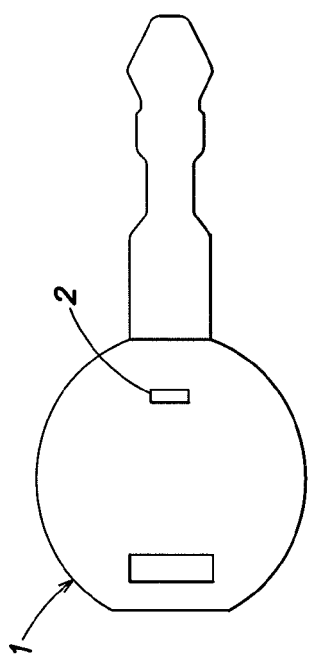
FIG. 1 illustrates an ignition key 1. with a programmable chip 2. incorporated therein.
Figure 2:
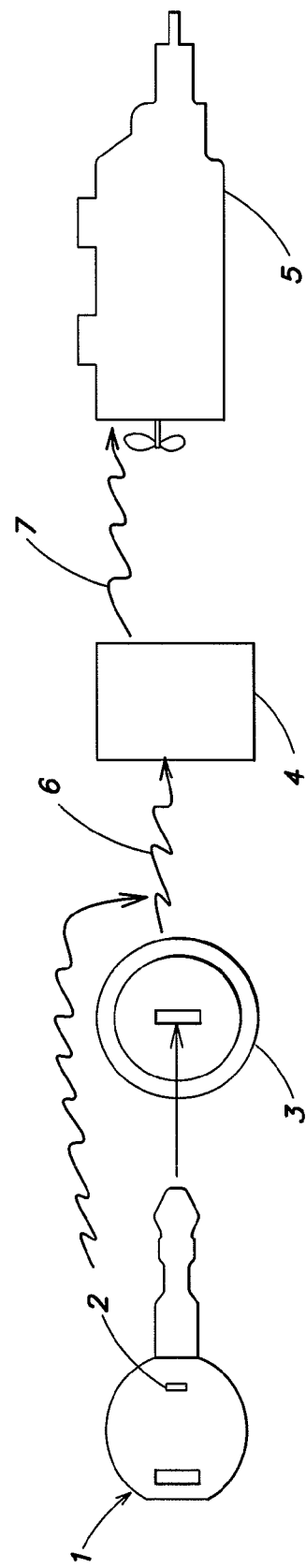
FIG. 2 illustrates the system where the ignition key 1. would be inserted into the ignition 3. The information from the programmable chip 2. is transmitted to the on board computer 4. as illustrated by wavy line 6. The information, as to maximum allowable speed of the motor vehicle, is transmitted from the on board computer 4. to the engine 5. as illustrated by wavy line 7.

The present invention involves a motor vehicle ignition key that incorporates a chip, as shown in FIG. 1. The ignition key chip is programmed to include specific information as to the operator of the motor vehicle. The information identifies the operator and further indicates a maximum allowable operating speed for the motor vehicle for that specific operator. The ignition key chip interacts with a computer positioned in the motor vehicle. The computer which, may be the motor vehicles on board computer, includes the speed of the motor vehicle in the input data processed. The computer further is able to output data that would limit the maximum speed of the motor vehicle, as illustrated in FIG. 2. The ignition key chip is programmable in order that the maximum allowable motor vehicle speed can be a unique speed for each of the potential operators of the motor vehicle. Further the ignition key chip may be reprogrammed in order that the maximum allowable speed for any specific operator may be increased or decreased from time to time.

There may be a number of ignition keys for the motor vehicle providing a variety of maximum speeds. By having a number of ignition keys with chips programmed for different maximum speeds allows different users of the motor vehicle to be limited as to the maximum speed at which the individual may operate the motor vehicle. The ignition key chip may also be capable of being reprogrammed allowing for a temporary or progressive change in the maximum allowable speed for the motor vehicle.

It is anticipated that the standard state of art, on board computer, is capable of being used with no programming to accept the input from the ignition key chip and provide an output that would limit the motor vehicles maximum speed. In the event the standard on board computer requires programming to accept the input from the ignition key chip and further provide an output in order to limit the motor vehicles maximum speed it is believed that such programming should be relatively easy. Should the standard on board computer be incapable of being programmed to accept the input from the ignition key chip and further to limit the motor vehicles maximum speed a separate computer may be incorporated in the system to accept the input from the ignition key chip and provide the output to limit the motor vehicle maximum speed.

It is further understood that the manner of staring and operating a motor vehicle that presently involves the use of an ignition key may be modified to include the use of operator identification devices such as: user code; voice prints; finger prints; eye identification; or other user specific identification. The means whereby the operator is identified and authorized will include information that indicates the maximum speed that is allowed for the specific individual. The computer on the motor vehicle will operate in the same fashion as for the ignition key chip.

There may be restrictions on the ability of the access means to provide information as to both the operators identity and maximum allowable motor vehicle speed. In such event the on board computer may be programmed to determine the maximum allowable speed based on the identity of the operator as provided by the access means. Another alternative would be for the access means to only provide input to the on board computer as to the maximum allowable speed for the user of the access means.

From the foregoing description it will be apparent that modifications can be made to the device without departing from the teaching of the present invention. Accordingly, it is distinctly understood that the invention is not limited to the preferred embodiment but may be embodied and practiced within the scope of the following claims.

We claim the following:

1. A programmable system that controls the maximum allowable speed of a motor vehicle, said motor vehicle adapted to control the speed of the motor vehicle, the system comprising:
   a. a programmable and reprogrammable key that permits access and operation of said motor vehicle, said key being configured to be programmed and re-programmed with information including the maximum allowable speed of the vehicle; and
   b. a computer that is positioned in the motor vehicle, said computer being able to receive the information including the maximum allowable speed of the vehicle from the key, said computer being interconnected with the vehicle to control the speed of the motor vehicle, further said computer being programmed to associate a maximum motor vehicle speed with the information including the maximum allowable speed of the vehicle programmed in the key.

2. A programmable system that controls the maximum allowable speed of a motor vehicle, as described in claim 1, wherein the key is unique for each operator of the motor vehicle, with a programmable chip incorporated in the key.

3. A system for controlling a speed of an automotive vehicle, the system comprising:
   a first device that is arranged to communicate information representative of a vehicle speed; and
   an automotive vehicle including an on-board computer that controls at least one vehicle operating parameter, the vehicle on-board computer being arranged to receive the information from the first device and control a vehicle operating parameter based on the information, control of the vehicle operating parameter limiting the automotive vehicle to a first maximum speed;
   wherein the on-board computer is reprogrammable to change the vehicle operating parameter from:
   a) limiting the automotive vehicle to a first maximum speed, to:

b) limiting the automotive vehicle to a second maximum vehicle speed based on the information from the first device.

4. The system according to claim 3, wherein the first device is useable to gain access to the vehicle and operate the vehicle.

5. The system according to claim 3, wherein the first device includes a computer chip that is programmed to include identification information and information indicative of a maximum speed for the vehicle.

6. The system according to claim 3, further comprising a second device that is arranged to communicate information that causes the vehicle on-board computer to limit the vehicle to a third maximum speed that is different from the first maximum speed.

7. The system according to claim 3, wherein the first device is separate from the vehicle.

8. The system according to claim 7, wherein the first device is an ignition key.

9. The system according to claim 8, wherein the ignition key comprises a chip.

10. The system according to claim 9, wherein the chip is programmable.

11. The system according to claim 8, wherein the system further comprising an operator identification device communicating with the on-board computer, with the ignition key and the operator identification device providing combined identifier information.

12. The system according to claim 11, wherein the on-board computer is adapted to control a vehicle operating parameter to limit the speed of the automotive vehicle based on the combined identifier information.

13. A method for controlling a speed of an automotive vehicle, the automotive vehicle including an on-board computer that controls at least one vehicle operating parameter, the method comprising:

receiving information from a vehicle ignition key;

communicating the information to the on-board computer;

causing the on-board computer to control the vehicle operating parameter limiting the automotive vehicle to a first maximum speed based on only the information from the ignition key; and allowing the on-board computer to be re-programmed to control the vehicle operating parameter limiting the automotive vehicle to a second maximum speed based on only said information from said ignition key.

* * * * *